US009896623B2

(12) United States Patent
Terazawa et al.

(10) Patent No.: US 9,896,623 B2
(45) Date of Patent: Feb. 20, 2018

(54) PRODUCTION METHOD OF RARE EARTH OXYSULFIDE, CERAMIC SCINTILLATOR AND ITS PRODUCTION METHOD, SCINTILLATOR ARRAY, AND RADIATION DETECTOR

(71) Applicant: HITACHI METALS, LTD., Tokyo (JP)

(72) Inventors: Shinsuke Terazawa, Mishima-gun (JP); Hideo Nitta, Mishima-gun (JP)

(73) Assignee: HITACHI METALS, LTD., Tokyo (JP)

(*) Notice: Subject to any disclaimer, the term of this patent is extended or adjusted under 35 U.S.C. 154(b) by 3 days.

(21) Appl. No.: 15/024,768

(22) PCT Filed: Sep. 10, 2014

(86) PCT No.: PCT/JP2014/073914
§ 371 (c)(1),
(2) Date: Mar. 24, 2016

(87) PCT Pub. No.: WO2015/045870
PCT Pub. Date: Apr. 2, 2015

(65) Prior Publication Data
US 2016/0230085 A1 Aug. 11, 2016

(30) Foreign Application Priority Data
Sep. 25, 2013 (JP) .................. 2013-198785

(51) Int. Cl.
G01T 1/20 (2006.01)
C09K 11/77 (2006.01)
(Continued)

(52) U.S. Cl.
CPC ...... C09K 11/7771 (2013.01); C01F 17/0093 (2013.01); C04B 35/5156 (2013.01);
(Continued)

(58) Field of Classification Search
CPC ................. G01T 1/20; G01T 1/1612
See application file for complete search history.

(56) References Cited

U.S. PATENT DOCUMENTS 3,850,837 A * 11/1974 Nath ............... C09K 11/7771
252/301.4 S
5,169,610 A * 12/1992 Yamada ............ G01T 1/203
423/21.1
(Continued)

FOREIGN PATENT DOCUMENTS

CN 101107206 A 1/2008
JP 59-021523 A 2/1984
(Continued)

OTHER PUBLICATIONS

International Search Report for PCT/JP2014/073914 dated Dec. 16, 2014 [PCT/ISA/210].
(Continued)

Primary Examiner — Kiho Kim
(74) Attorney, Agent, or Firm — Sughrue Mion, PLLC

(57) ABSTRACT

A production method of rare earth oxysulfide comprising a step of mixing a rare earth compound with sulfuric acid and/or sulfate in such a proportion that sulfate ions are 0.75-1.75 mol to 1 mol of a rare earth element, thereby preparing a reaction solution to obtain a product; a step of calcining the product to obtain calcined powder; and a step of reducing the calcined powder to obtain rare earth oxysulfide.

19 Claims, 17 Drawing Sheets

(51) Int. Cl.
*C04B 35/547* (2006.01)
*C04B 35/515* (2006.01)
*C04B 35/626* (2006.01)
*C01F 17/00* (2006.01)

(52) U.S. Cl.
CPC ........ *C04B 35/547* (2013.01); *C04B 35/6265* (2013.01); *C04B 35/6268* (2013.01); *C09K 11/7701* (2013.01); *G01T 1/20* (2013.01); *G01T 1/2006* (2013.01); *C01P 2002/72* (2013.01); *C01P 2002/88* (2013.01); *C01P 2004/03* (2013.01); *C04B 2235/3224* (2013.01); *C04B 2235/3229* (2013.01); *C04B 2235/44* (2013.01); *C04B 2235/442* (2013.01); *C04B 2235/443* (2013.01); *C04B 2235/444* (2013.01); *C04B 2235/447* (2013.01); *C04B 2235/448* (2013.01); *C04B 2235/449* (2013.01); *C04B 2235/662* (2013.01)

(56) References Cited

U.S. PATENT DOCUMENTS

| | | | |
|---|---|---|---|
| 6,153,123 A * | 11/2000 | Hampden-Smith | B01J 2/003 106/31.14 |
| 6,296,824 B1 * | 10/2001 | Leppert | C01F 17/0093 423/263 |
| 7,303,699 B2 | 12/2007 | Kobusch et al. | |
| 2004/0100000 A1 | 5/2004 | Kobusch et al. | |
| 2006/0065842 A1 * | 3/2006 | Okamura | G01T 1/2928 250/370.09 |
| 2008/0210877 A1 * | 9/2008 | Altman | A61B 6/032 250/366 |
| 2008/0210885 A1 | 9/2008 | Bolyasnikova et al. | |
| 2010/0130350 A1 | 5/2010 | Machida et al. | |

FOREIGN PATENT DOCUMENTS

| | | |
|---|---|---|
| JP | 59-162132 A | 9/1984 |
| JP | 59-164631 A | 9/1984 |
| JP | 2989184 B1 | 12/1999 |
| JP | 2000-178547 A | 6/2000 |
| JP | 2000-313619 A | 11/2000 |
| JP | 2003-027058 A | 1/2003 |
| JP | 2004-525848 A | 8/2004 |

OTHER PUBLICATIONS

Haynes, et al., "Preparation and Luminescence of Selected $Eu^{3+}$-Activated Rare Earth-Oxygen-Sulfur Compounds", J. Electrochem. Soc., vol. 115, No. 10, Oct. 1, 1968, pp. 1060-1066 (7 pages), XP-001280516.

Communication dated Apr. 20, 2017, from the European Patent Office in counterpart European application No. 14848392.8.

* cited by examiner

First Embodiment

Second Embodiment

Example 1

6 µm

Example 3

30 µm

Comparative Example 1

6 µm

Example 1

3 μm

Comparative Example 1

3 μm

Comparative Example 1

3 μm

Example 1

30 μm

Example 3

30 μm

Comparative Example 1

Foreign Phases of $Gd_2O_3$

30 μm

PRODUCTION METHOD OF RARE EARTH OXYSULFIDE, CERAMIC SCINTILLATOR AND ITS PRODUCTION METHOD, SCINTILLATOR ARRAY, AND RADIATION DETECTOR

CROSS REFERENCE TO RELATED APPLICATIONS

This application is a National Stage of International Application No. PCT/JP2014/073914 filed Sep. 10, 2014 (claiming priority based on Japanese Patent Application No. 2013-198785 filed Sep. 25, 2013), the contents of which are incorporated herein by reference in their entirety.

FIELD OF THE INVENTION

The present invention relates to a method for producing rare earth oxysulfide, a ceramic scintillator using such rare earth oxysulfide and its production method, and a scintillator array using such ceramic scintillators, and a radiation detector used in an X-ray CT apparatus, etc.

BACKGROUND OF THE INVENTION

One of X-ray diagnosis apparatuses is a computed tomography (CT) apparatus. The CT apparatus comprises an X-ray tube for radiating X-ray fan beams, and a radiation detector comprising a large number of radiation detection elements. X-ray fan beams radiated from the X-ray tube pass through an object to be measured, and are detected by the radiation detector. The detected data are analyzed by a computer to display a cross section of the object. The measured data are analyzed by a computer to calculate X-ray absorbance at each position in each cross section of the object by a computer, thereby forming an image based on the X-ray absorbance.

As radiation detectors for detecting radiations such as X-rays, etc., radiation detectors comprising radiation-detecting elements obtained by combining ceramic scintillators produced by sintering rare earth oxysulfide powder such as $Gd_2O_2S$, $Y_2O_2S$, $Lu_2O_2S$, etc. comprising Pr, Ce, Eu, Tb, etc. as luminescent elements, and silicon photodiodes have been developed and put into practical use. The radiation detector generally has a structure comprising one or more lines of plural radiation-detecting elements to simultaneously detect X-rays at many positions. In the radiation detector comprising ceramic scintillators, detecting elements can easily be made small to increase the number of channels, thereby obtaining high-resolution image.

In such radiation-detecting elements, when scintillators absorbing radiations emit light with large intensity (luminescence intensity), they have high sensitivity. Diagnosis apparatuses utilizing radiations are recently required strongly to reduce radiations to which humans are exposed. As a result, it has become important to shorten the scanning time. Shorter scanning time from the present level results in shorter integration time in one detecting element, thereby reducing the total amount of radiations absorbed during the integration time. Accordingly, scintillators having high luminescence efficiency (large luminescence intensity) are particularly needed.

Japanese Patent 2989184 discloses a method for producing a ceramic scintillator having sufficient luminescence intensity, comprising the steps of mixing rare earth oxide with sulfur and an alkali flux, calcining the resultant mixture in an alumina crucible, disintegrating the calcined product in pure water, washing the product with pure water, hydrochloric acid and warm water successively to obtain scintillator powder, introducing this powder into a soft iron capsule, and subjecting it to hot-isostatic pressing for sintering.

JP 2000-313619 A discloses a method for inexpensively producing rare earth oxysulfide powder used in scintillators, comprising the steps of dispersing at least one rare earth oxide in water, adding 1 mol of sulfuric acid or sulfate corresponding to at least one rare earth to 1 mol of rare earth oxide, calcining the resultant powdery precipitate, and reducing the resultant rare earth oxysulfate.

JP 2004-525848 A discloses a method for producing a high-density, translucent scintillator ceramic, which comprises wet-pulverizing rare earth oxysulfide in a pulverizing organic liquid to powder having particle sizes of less than 10 µm, forming this powder into a green body having a density of 40-60%, and sintering the green body at a temperature of 1200-1450° C. under atmospheric pressure in vacuum or an inert gas.

OBJECTS OF THE INVENTION

In the production method of Japanese Patent 2989184, an alkali flux is used in the reaction of the rare earth oxide with sulfur, needing washing with hydrochloric acid, pure water, etc. to remove an alkali component from the resultant rare earth oxysulfide powder. In addition to using a flux, hydrochloric acid, etc., it needs large numbers of steps, resulting in high cost. Accordingly, an object of the present invention is to provide a method for producing rare earth oxysulfide inexpensively.

In the production method of JP 2000-313619 A, with 1 mol of sulfuric acid added to 1 mol of rare earth oxide in the suspension, the calcining and reduction of a precipitate theoretically provides rare earth oxysulfide having the general formula of $RE_2O_2S$, wherein RE is a rare earth element. However, rare earth ions and sulfate ions are actually eluted depending on precipitating conditions, sulfides such as sulfate ions, etc. may be dissociated together with oxygen during calcining, reduction, etc., resulting in component deviation due to insufficient sulfur. Thus, excessive rare earth oxide remains as an impurity in the rare earth oxysulfide powder. Accordingly, a ceramic scintillator obtained by sintering such rare earth oxysulfide contains foreign phases of rare earth oxides, resulting in poor luminescence intensity.

In the production method of JP 2004-525848 A, the dissociation of sulfur during pulverization cannot completely be suppressed, resulting in lattice defects due to the vacancy of sulfur dissociated from the rare earth oxysulfide. The lattice defects remain even in a ceramic scintillator obtained by sintering such rare earth oxysulfide, so that the ceramic scintillator has poor luminescence intensity. Accordingly, another object of the present invention is to provide a ceramic scintillator having reduced component deviation and little foreign phases to have large luminescence intensity and exhibit high-sensitivity response to radiation, and its production method.

Another object of the present invention is to provide a scintillator array comprising such ceramic scintillators, and a radiation detector suitable for an X-ray CT apparatus, etc.

DISCLOSURE OF THE INVENTION

As a result of intensive research in view of the above objects, the inventors have found that rare earth oxysulfide containing little impurity is obtained by mixing 0.75-1.75 mol of sulfate ions with 1 mol of a rare earth element, and calcining and reducing the resultant product; that a ceramic scintillator produced by using such rare earth oxysulfide powder has high luminescence intensity with little foreign phases, exhibiting high-sensitivity response to radiation. The present invention has been completed based on such findings.

Thus, the method of the present invention for producing rare earth oxysulfide comprises the steps of
mixing a rare earth compound with sulfuric acid and/or sulfate in such a proportion that sulfate ions are 0.75-1.75 mol to 1 mol of the rare earth element, thereby causing their reaction to form a product;
calcining the product to obtain a calcined powder; and
reducing the calcined powder to obtain rare earth oxysulfide.

The rare earth compound is preferably at least one selected from the group consisting of oxides, hydroxides, halides, nitrates, sulfates, acetates, phosphates and carbonates of rare earth elements.

After the mixing step or the calcining step, the product or the calcined powder is preferably pulverized. The rare earth element in the rare earth compound preferably comprises at least gadolinium, or at least gadolinium and praseodymium. The sulfate is preferably sulfate of the same rare earth element as in the rare earth compound.

A rare earth compound comprising one type of rare earth element, or rare earth compounds comprising plural types of rare earth elements may be used. When plural types of rare earth compounds are mixed, smaller amounts of rare earth compounds are preferably earlier added to an aqueous solution of sulfate ions in the mixing step.

In the mixing step, the reaction solution is preferably heated to form the product stably. To extract the product, the reaction solution may be filtered and then dried to obtain the product, or the reaction solution may be dried by heating, etc.

The method of the present invention for producing a ceramic scintillator comprises the steps of granulating the rare earth oxysulfide powder obtained by the above method to form granules; molding the granules to obtain a green body; and sintering the green body to obtain a sintered rare earth oxysulfide. The sintering step is preferably carried out at 1300-1600° C. in an inert atmosphere at atmospheric pressure. After the sintering step, the sintered body is preferably annealed.

The ceramic scintillator of the present invention is obtained by the above production method.

The scintillator array and radiation detector of the present invention comprise such ceramic scintillators.

DESCRIPTION OF THE PREFERRED EMBODIMENTS

The method of the present invention for producing rare earth oxysulfide, a ceramic scintillator and its production method, a scintillator array, and a radiation detector are explained in detail below, without intention of restricting the present invention to embodiments below.

[1] First Embodiment

Figure 1A:
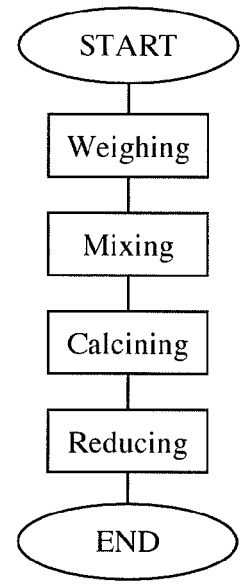
FIG. 1(a) is a view showing the production method of rare earth oxysulfide according to the first embodiment of the present invention.

A flow chart of the production method of rare earth oxysulfide according to the first embodiment of the present invention is shown in FIG. 1(a).

(1-1) Weighing Step

In the weighing step, predetermined amounts of rare earth compound powder and sulfuric acid and/or sulfate are prepared. The rare earth compound may be at least one selected from the group consisting of oxides, hydroxides, halides, nitrates, sulfates, acetates, phosphates and carbonates of a rare earth elements, and a rare earth element oxide is particularly preferable as a high-purity, chemically stable material.

There are 17 types of rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Rare earth compounds comprising one or more types of rare earth elements may be used for the rare earth compound powder. When a rare earth compound comprising one type of rare earth element is used, the rare earth element is preferably gadolinium. When rare earth compounds comprising plural types of rare earth elements are used, the rare earth elements preferably include at least gadolinium, and may further include praseodymium.

Sulfuric acid and/or sulfate are added in such an amount that sulfate ions are 0.75-1.75 mol to 1 mol of the rare earth element. When sulfate containing a rare earth element is used, the above rare earth element includes not only a rare earth element in the rare earth compound, but also a rare earth element in sulfate. When a rare earth compound containing sulfate ions is used, the above sulfate ions include not only sulfate ions in sulfuric acid and/or sulfate, but also sulfate ions in the rare earth compound. When sulfate ions are less than 0.75 mol to 1 mol of the rare earth element, component deviation occurs by the dissociation of sulfur, when a powdery product is collected by filtration in the subsequent mixing step, and when it is heated in the calcining step and the reduction step, so that a rare earth compound remains as an impurity in the resultant rare earth oxysulfide powder. Even though sulfate ions exceed 1.75 mol relative to 1 mol of the rare earth element, the reaction of sulfate ions with a rare earth compound does not change, but sulfate ions are desirably 1.75 mol or less to suppress the generation of sulfur-containing gases such as $H_2S$, $SO_x$, etc.

(1-2) Mixing Step

In the mixing step, the rare earth compound is mixed with sulfuric acid and/or sulfate to prepare a reaction solution, and the resultant product is collected. The mixing method of the rare earth compound with sulfuric acid includes, for example, (1) a method of adding rare earth compound powder to sulfuric acid and stirring the resultant mixture to cause their reaction, and (2) a method of adding rare earth compound powder to water, stirring the resultant mixture to cause their reaction, and adding sulfuric acid to the mixture.

In the case of the method (1), though the concentration of sulfuric acid is not restricted, dilute sulfuric acid is preferably 0.1-2 mol per 1 liter of water, from the aspect of a speed of reaction with the rare earth compound. The rare earth compound powder may be added by a known means. When rare earth compounds comprising plural types of rare earth elements are added, rare earth compounds containing smaller amounts of rare earth elements are preferably earlier added to dilute sulfuric acid, thereby reacting and diffusing smaller amounts of rare earth compounds earlier to prevent uneven composition distribution in the product.

In the case of the method (2), though the concentration of a rare earth compound-water mixed solution is not restricted, the rare earth compound is preferably 0.05-2 mol per 1 liter of water, from the aspect of dispersibility (uniformity of composition) of the rare earth compound, and a reaction speed after sulfuric acid is added. Sulfuric acid may be added to the above mixed solution by a known means. The concentration of sulfuric acid is preferably 10-98% by mass. When the rare earth compound is substantially insoluble in water like rare earth oxide, the resultant mixed liquid is an aqueous powder dispersion.

When the rare earth compound is mixed with sulfate, the sulfate may be ammonium sulfate, etc. However, it is preferable to use sulfate of the same rare earth element as in the rare earth oxysulfide powder. The mixing method of the rare earth compound with sulfate includes, for example, (3) a method of adding sulfate to water, adding rare earth compound powder to the resultant aqueous solution, and stirring the resultant mixture to cause their reaction; and (4) a method of adding rare earth compound powder to water, stirring the mixture to cause their reaction, and adding an aqueous sulfate solution to the mixture. Sulfate may be added by known methods. The amount of sulfate added is adjusted such that sulfate ions are 0.75-1.75 mol to 1 mol of the rare earth element.

Reaction heat is generated by mixing the rare earth compound powder with sulfate ions. In a solution in which the rare earth compound powder and sulfate ions are added and reacted, the concentration of a rare earth element and a reaction solution temperature are in a negative relation that a higher temperature provides a lower rare earth element concentration in the reaction solution, thereby forming a product. To collect as much a product as possible, a reaction solution containing the formed product may be heated to a predetermined temperature for a predetermined period of time. Heating accelerates the formation of a product. The product may be collected by separating from the reaction solution and then heat-drying, or by heating the reaction solution to evaporate a liquid. When the product is separated from the reaction liquid and then dried by heating, the drying time is shortened, but a sulfur compound such as rare earth sulfate, etc. may remain in the solution. When the reaction solution is heated, the number of steps is reduced because aging occurs simultaneously.

(1-3) Calcining Step

The resultant product is calcined in the calcining step. The calcining step may be conducted in air at atmospheric pressure. The calcining temperature is preferably 400-1100° C., more preferably 600-900° C. When the calcining temperature is higher than 1100° C., rare earth sulfate in the product may be decomposed. To remove crystal water from hydrate in the product completely, the temperature is preferably at least 400° C. Sulfur-containing gases such as $H_2S$, $SO_x$, etc. generated at this time can be collected by a known technique, such as bubbling in a neutralizing aqueous solution, etc.

(1-4) Reduction Step

In the reduction step, the calcined powder is heat-treated, using as a reducing agent a hydrogen gas, a hydrocarbon gas such as methane and propane, etc. The reducing atmosphere may contain, in addition to the above reducing agent, an inert gas such as nitrogen ($N_2$) and argon (Ar) depending on a reaction speed. The reduction treatment is preferably conducted, for example, at a temperature of 600-1000° C. for 10-300 minutes. Sulfur-containing gases such as $H_2S$, $SO_x$, etc. generated at this time can be collected by a known technique such as bubbling in a neutralizing aqueous solution, etc.

Thus, rare earth oxysulfide containing little rare earth compound as an impurity can be produced by mixing the rare earth compound with sulfuric acid and/or sulfate in such a proportion that sulfate ions are 0.75-1.75 mol to 1 mol of the rare earth element, to form a reaction solution, and calcining and reducing the resultant product.

(2) Typical Examples

Chemical reactions in the method of the present invention for producing rare earth oxysulfide will be explained with the following typical examples, without intention of restriction. Reaction formulae shown below are presumed from the measured XRD, etc.

(2-1) First Typical Example

Gadolinium oxide powder and sulfuric acid are prepared in a proportion of 2 mol of sulfuric acid to 1 mol of gadolinium oxide, such that sulfate ions are 1 mol to 1 mol of gadolinium. Gadolinium oxide powder is added to dilute sulfuric acid prepared by adding sulfuric acid to water, and stirred to cause their reaction. A reaction expressed by the formula (1-1) below occurs between dilute sulfuric acid and gadolinium oxide.

$$Gd_2O_3+2H_2SO_4 \rightarrow Gd_2O_3 \cdot 2Gd_2(SO_4)_3 \cdot lH_2O \qquad (1-1).$$

The resultant product is calcined to cause reactions expressed by the following formulae (1-2) and (1-3);

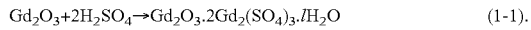
$$Gd_2O_3 \cdot 2Gd_2(SO_4)_3 \cdot lH_2O \rightarrow (3/2)Gd_2O_2SO_4+(3/2)Gd_2(SO_4)_3+lH_2O \qquad (1-2), \text{ and}$$

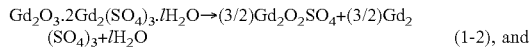

$$Gd_2(SO_4)_3 \rightarrow (1-\alpha)Gd_2(SO_4)_3+\alpha Gd_2O_2SO_4+2\alpha SO_3 \qquad (1-3),$$

wherein $\alpha$ is a coefficient meeting $0 \le \alpha \le 1$. The higher the calcining temperature, the larger the value of $\alpha$. Namely, a higher calcining temperature causes more reaction of $Gd_2(SO_4)_3$, which is generated by the formula (1-2), according to the formula (1-3), increasing the amount of gadolinium oxysulfate ($Gd_2O_2SO_4$) in the calcined powder. However, gadolinium oxysulfate starts to be decomposed in the product when the temperature exceeds 1100° C., resulting in a smaller amount of gadolinium oxysulfate.

The calcined powder is reduced with hydrogen as a reducing agent. Reduction reactions occur in $Gd_2O_2SO_4$ according to the formula (1-4) and in $Gd_2(SO_4)_3$ according to the formula (1-5), resulting in a reaction expressed by the formula (1-6) as a whole.

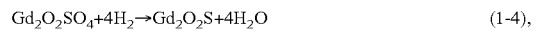
$$Gd_2O_2SO_4+4H_2 \rightarrow Gd_2O_2S+4H_2O \qquad (1-4),$$

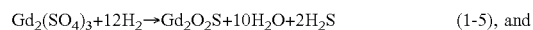
$$Gd_2(SO_4)_3+12H_2 \rightarrow Gd_2O_2S+10H_2O+2H_2S \qquad (1-5), \text{ and}$$

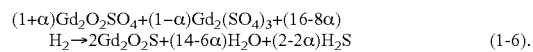
$$(1+\alpha)Gd_2O_2SO_4+(1-\alpha)Gd_2(SO_4)_3+(16-8\alpha)H_2 \rightarrow 2Gd_2O_2S+(14-6\alpha)H_2O+(2-2\alpha)H_2S \qquad (1-6).$$

Gadolinium oxysulfide ($Gd_2O_2S$) is thus obtained. In the calcining step and the reduction step, what happens by component deviation occurring by the dissociation of sulfur is merely decrease in the amounts of $SO_3$ and $H_2S$ generated, resulting in substantially no gadolinium oxide remaining in gadolinium oxysulfide.

(2-2) Second Typical Example

Gadolinium oxide powder and sulfuric acid are prepared in a proportion of 3 mol of sulfuric acid to 1 mol of gadolinium oxide, such that sulfate ions are 1.5 mol to 1 mol of gadolinium. Gadolinium oxide powder is added to dilute sulfuric acid prepared by adding sulfuric acid to water, and stirred to cause their reaction. A reaction expressed by the formula (2-1) below occurs between dilute sulfuric acid and gadolinium oxide.

$$Gd_2O_3+3H_2SO_4 \rightarrow Gd_2(SO_4)_3 \cdot 8H_2O \qquad (2-1).$$

The resultant product is calcined to cause reactions expressed by the following formulae (2-2) and (2-3):

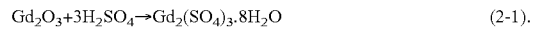
$$Gd_2(SO_4)_3 \cdot 8H_2O \rightarrow Gd_2(SO_4)_3+8H_2O \qquad (2-2), \text{ and}$$

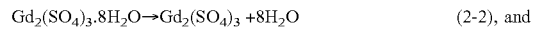

$$Gd_2(SO_4)_3 \rightarrow (1-\beta)Gd_2(SO_4)_3+\beta Gd_2O_2SO_4+2\alpha SO_3 \qquad (2-3),$$

wherein $\beta$ is a coefficient meeting $0 \le \beta \le 1$.

$\beta$ increases as the calcining temperature is elevated. Namely, a higher calcining temperature causes a reaction expressed by the formula (2-3) in part of $Gd_2(SO_4)_3$ in the formula (2-2), forming gadolinium oxysulfate ($Gd_2O_2SO_4$) in the calcined powder. However, gadolinium oxysulfate starts to be decomposed in the product when the temperature exceeds 1100° C., resulting in a smaller amount of gadolinium oxysulfate.

The calcined powder is reduced with hydrogen as a reducing agent. Reduction reactions occur in $Gd_2O_2SO_4$ according to the formula (2-4) and in $Gd_2(SO_4)_3$ according to the formula (2-5), resulting in a reaction expressed by the formula (2-6) as a whole.

$$Gd_2O_2SO_4+4H_2 \rightarrow Gd_2O_2S+4H_2O \qquad (2-4),$$

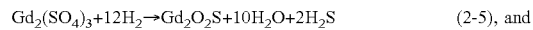
$$Gd_2(SO_4)_3+12H_2 \rightarrow Gd_2O_2S+10H_2O+2H_2S \qquad (2-5), \text{ and}$$

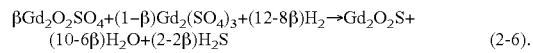
$$\beta Gd_2O_2SO_4+(1-\beta)Gd_2(SO_4)_3+(12-8\beta)H_2 \rightarrow Gd_2O_2S+(10-6\beta)H_2O+(2-2\beta)H_2S \qquad (2-6).$$

Gadolinium oxysulfide ($Gd_2O_2S$) is thus obtained. Like in the first typical example, what happens in the calcining step and the reduction step by component deviation due to the dissociation of sulfur is merely decrease in the amounts of $SO_3$ and $H_2S$ generated, resulting in substantially no gadolinium oxide remaining in gadolinium oxysulfide.

(2-3) Reference Example

For reference, chemical reactions in a conventional production method of rare earth oxysulfide are shown below. Gadolinium oxide powder and sulfuric acid are prepared in a proportion of 1 mol of sulfuric acid to 1 mol of gadolinium oxide, such that sulfate ions are 0.5 mol to 1 mol of gadolinium. Gadolinium oxide powder is added to dilute sulfuric acid prepared by adding sulfuric acid to water, and stirred to cause their reaction. Reactions expressed by the formulae (3-1) and (3-2) below occur between dilute sulfuric acid and gadolinium oxide.

$$3Gd_2O_3 + 3H_2SO_4 \rightarrow 2Gd_2O_3 + Gd_2(SO_4)_3 \cdot nH_2O \quad (3\text{-}1), \text{ and}$$

$$2Gd_2O_3 + Gd_2(SO_4)_3 \cdot nH_2O \rightarrow 2Gd_2O_3 \cdot Gd_2(SO_4)_3 \cdot mH_2O \quad (3\text{-}2).$$

The resultant product is calcined to cause a reaction expressed by the following formula (3-3).

$$2Gd_2O_3 \cdot Gd_2(SO_4)_3 \cdot mH_2O \rightarrow 3Gd_2O_2SO_4 + mH_2O \quad (3\text{-}3).$$

The calcined powder is reduced with hydrogen as a reducing agent. The reduction treatment causes a reaction expressed by the following formula (3-4):

$$Gd_2O_2SO_4 + 4H_2 \rightarrow Gd_2O_2S + 4H_2O \quad (3\text{-}4).$$

Gadolinium oxysulfide ($Gd_2O_2S$) is thus obtained. Unlike the first and second typical examples, gases such as $SO_3$ and $H_2S$ are not generated in the calcining step and the reduction step, but gadolinium oxide is likely to remain as an impurity in gadolinium oxysulfide, when component deviation occurs by the dissociation of sulfur in the mixing step, the calcining step and the reduction step. The dissociation of sulfur in the calcining step and the reduction step seems to be influenced by a temperature gradient in a furnace, atmospheric partial pressure, etc.

[2] Second Embodiment

Figure 1B:
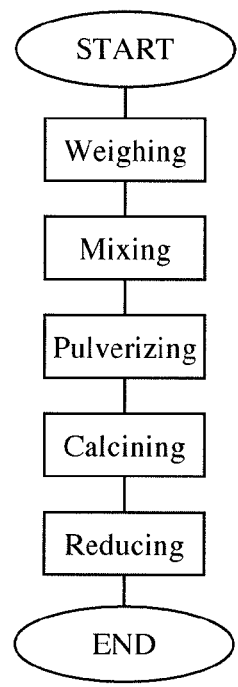
FIG. 1(b) is a view showing the production method of rare earth oxysulfide according to the second embodiment of the present invention.

A flow chart of the production method of rare earth oxysulfide according to the second embodiment of the present invention is shown in FIG. 1(b). The second embodiment is the same as the first embodiment, except for comprising a step of pulverizing a product obtained by the mixing step. When a pulverization step is carried out after rare earth oxysulfide is formed by reduction, sulfur is easily removed to cause defects. Accordingly, pulverization is carried out preferably after the mixing step or the calcining step, before the reduction step. With the product pulverized to fine powder before the reduction step, rare earth oxysulfide remains in the form of fine powder after the reduction step. Accordingly, fine powder of rare earth oxysulfide is obtained while preventing sulfur defects. The pulverization of the product is preferably wet pulverization using a wet-type ball mill.

[3] Ceramic Scintillator

The resultant rare earth oxysulfide powder is granulated to form granules. The granulation step may be conducted by a known method. The granules of rare earth oxysulfide are formed into a green body by a known method such as mono-axial pressing, cold-isostatic pressing, etc., and sintered in an inert atmosphere such as nitrogen ($N_2$), argon (Ar), etc. to form a sintered body. The sintering temperature is preferably 1300-1600° C. Though sintering may be conducted under pressure, sintering under almost atmospheric pressure in an inexpensive apparatus is preferable. To remove strain, etc. from the sintered body, the sintered body may be annealed in an inert atmosphere. Annealing improves the luminescence intensity.

The sintered body can be used as a ceramic scintillator. For example, when gadolinium, praseodymium and cerium are used as rare earth elements in rare earth oxysulfide, the sintered body is a ceramic scintillator of gadolinium oxysulfide containing praseodymium as a luminescent element, and cerium as an additive for adjusting afterglow. Because the rare earth oxysulfide of the present invention contains small amounts of rare earth compounds as impurities, a ceramic scintillator made of such rare earth oxysulfide containing little foreign phases of rare earth compounds has large luminescence intensity, exhibiting high-sensitivity response to radiations. The "foreign phases" are other compounds than the rare earth oxysulfide in the sintered body, mainly rare earth compounds, which are starting materials of rare earth oxysulfide, or rare earth oxides generated by the dissociation of sulfur in the production process of rare earth oxysulfide.

[4] Scintillator Array

The scintillator array of the present invention comprises pluralities of the above ceramic scintillators arranged with a material reflecting light emitted from the scintillators. The scintillator array may have a known structure and may be produced by a known method. For example, the ceramic scintillator is fixed to a support plate via a double-sided adhesive sheet. The scintillator substrate is then provided with grooves to form a grooved scintillator substrate having pluralities of scintillator cells. The grooves are filled with a liquid hardening resin for a reflecting material, and the liquid hardening resin is cured to form a resin-hardened scintillator cell body. The double-sided adhesive sheet is peeled from the resin-hardened scintillator cell body to obtain a scintillator array. To obtain a radiation detector having pluralities of radiation-detecting elements, it is preferable to form a scintillator array comprising pluralities of ceramic scintillators arranged with a reflecting material.

[5] Radiation Detector

The radiation detector of the present invention comprises the above ceramic scintillators, and detecting elements such as silicon photodiodes for detecting light emitted from the ceramic scintillators. For example, a luminescence surface of a scintillator array comprising the ceramic scintillators obtained by the above method is adhered with an optical resin to a light-receiving surface of a light-receiving element array. A silicon photodiode array is preferably used with the above scintillator array to efficiently produce a radiation detector. To obtain a radiation detector comprising pluralities of radiation-detecting elements, pluralities of ceramic scintillators are preferably arranged with reflecting materials to form plural lines of scintillator arrays. This radiation detector is suitably used in an imaging apparatus for medical diagnosis such as X-ray CT, PET (positron emission tomography)/CT, etc. Using the ceramic scintillator of the present invention having large luminescence intensity, a high-performance radiation detector having high sensitivity to X-rays, high response and excellent stability can be obtained.

The present invention will be explained specifically by Examples below. The production method of rare earth oxysulfide, the ceramic scintillator and its production method, and the radiation detector in the present invention are not restricted to Examples below.

EXAMPLE 1

2 mol of sulfuric acid was used to 1 mol of rare earth compounds, such that sulfate ions were 1 mol to 1 mol of the rare earth elements. Rare earth oxysulfide was synthesized (Steps 1 to 5) according to the second embodiment.

163.62 g of sulfuric acid having a concentration of 96% by mass was weighed and added to 1600 ml of pure water in a 3-liter beaker, to prepare dilute sulfuric acid (Step 1).

0.0113 g of cerium nitrate, 0.2561 g of praseodymium oxide and 290.00 g of gadolinium oxide were added to dilute sulfuric acid in a 3-liter beaker in this order, to cause their reaction. The resultant reaction solution was heated to 90° C. in a hot bath and kept at 90° C. for 150 minutes, while stirring by a stirrer (Step 2).

Figure 2A:
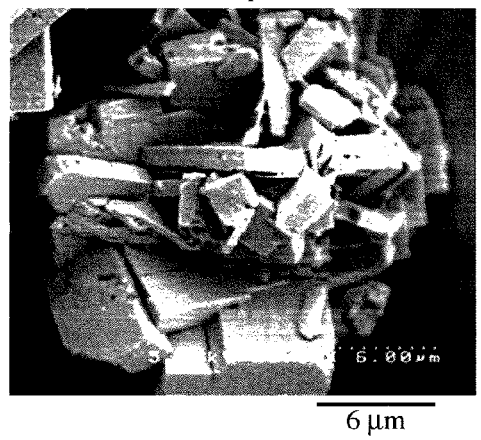
FIG. 2(a) is a SEM photograph (magnification: 5,000 times) of a product obtained by the mixing step of Example 1.
Figure 2B:
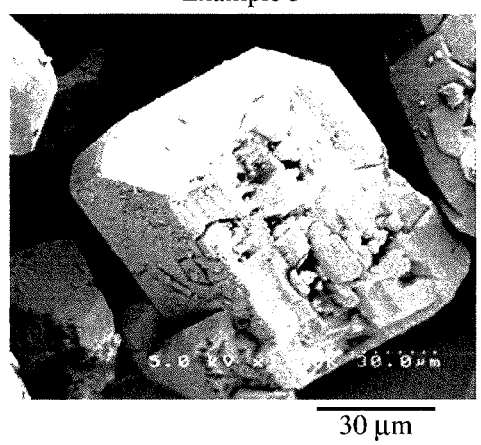
FIG. 2(b) is a SEM photograph (magnification: 1,000 times) of a product obtained by the mixing step of Example 3.
Figure 2C:
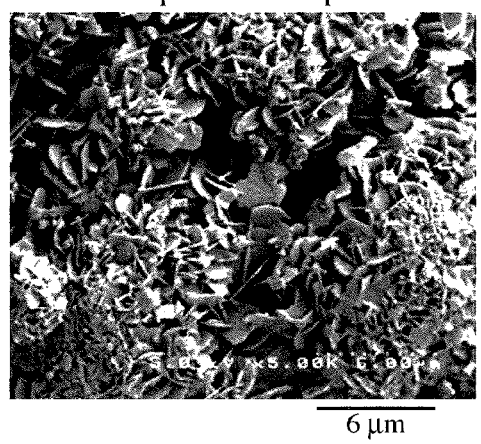
FIG. 2(c) is a SEM photograph (magnification: 5,000 times) of a product obtained by the mixing step of Comparative Example 1.
Figure 3:
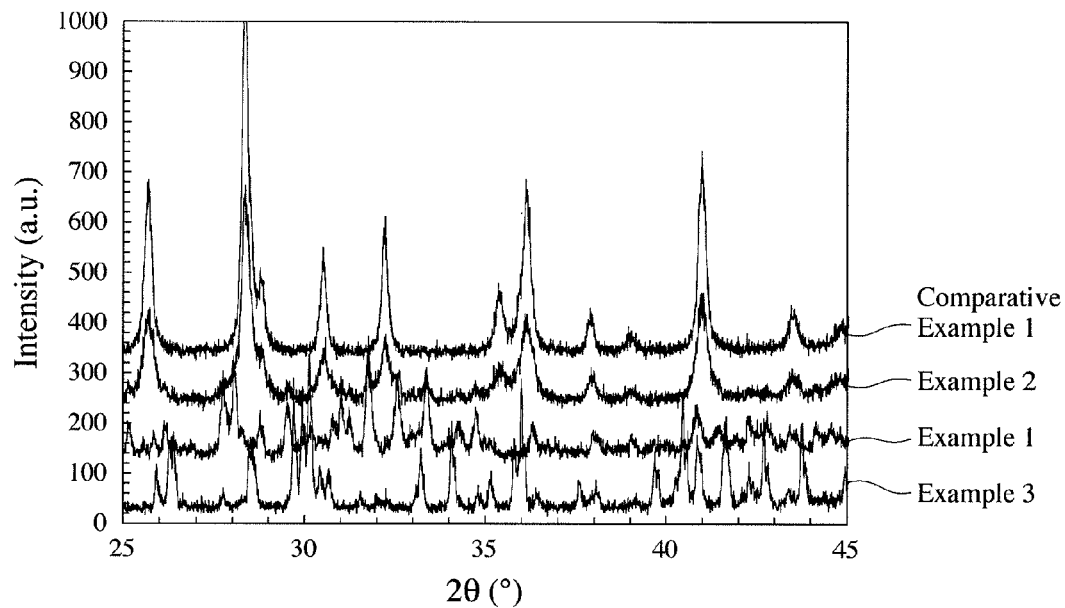
FIG. 3 is a graph showing powder X-ray diffraction patterns of products obtained by the mixing steps of Examples 1-3 and Comparative Example 1.

Immediately thereafter, the reaction solution was filtered by a Buchner funnel while stirring, to obtain a product. The product was dried at 120° C. for 12 hours, and then disintegrated by a mortar to sizes passing through a sieve having openings of 500 µm. FIG. 2(a) is a SEM photograph showing the appearance of the product. The SEM photograph was taken by S-9000 available from Hitachi High-Technologies Corporation. FIG. 3 shows an X-ray diffraction pattern of the product. The X-ray diffraction pattern was measured by X'Pert Powder available from PANalytical. Measurement was conducted using an X-ray diffraction apparatus having a Cu target as an X-ray source, under the conditions of tube voltage of 45 kV and tube current of 40 mA. In FIG. 3, pluralities of graphs are properly offset.

Figure 4A:
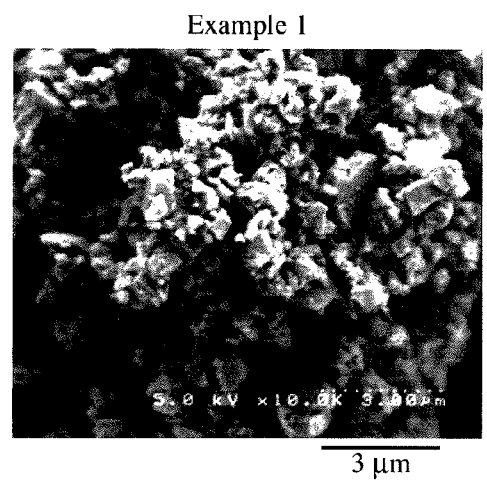
FIG. 4(a) is a SEM photograph (magnification: 10,000 times) of a product obtained by the pulverization step of Example 1.
Figure 4B:
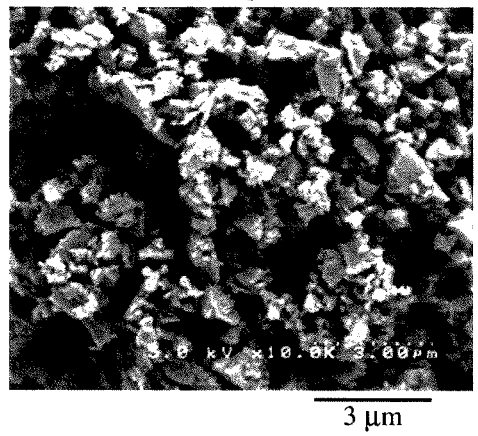
FIG. 4(b) is a SEM photograph (magnification: 10,000 times) of a product obtained by the pulverization step of Example 3.
Figure 4C:
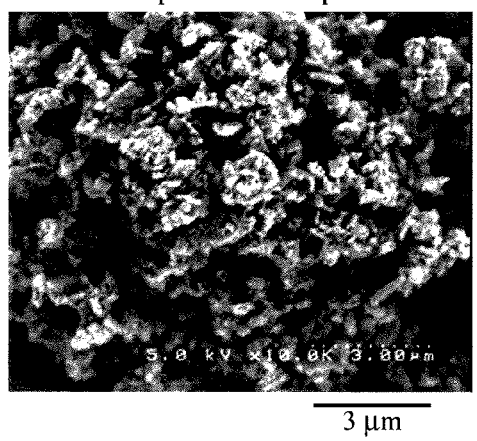
FIG. 4(c) is a SEM photograph (magnification: 10,000 times) of a product obtained by the pulverization step of Comparative Example 1.

100 g of the product and 200 ml of ethanol were charged into a ball mill, and wet-pulverized at 100 rpm for 15 hours. The pulverized slurry was dried at 100° C. for 4-6 hours. The dried product was disintegrated by a mortar to sizes passing through a sieve having openings of 500 µm to obtain fine product particles (Step 3). FIG. 4(a) is a SEM photograph showing the appearance of the pulverized product, in which particles were pulverized to substantially the same size, like those of Example 3 and Comparative Example 1 shown in FIGS. 4(b) and 4(c) described below.

Figure 5A:
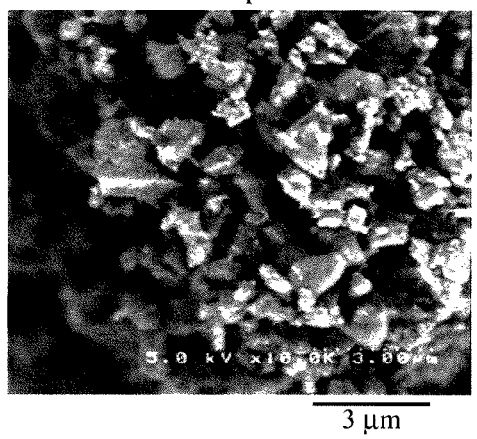
FIG. 5(a) is a SEM photograph (magnification: 10,000 times) of a powder obtained by the calcining step of Example 1.
Figure 5B:
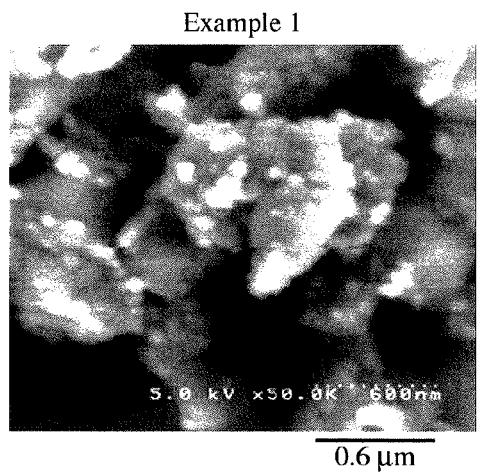
FIG. 5(b) is a SEM photograph (magnification: 50,000 times) of a powder obtained by the calcining step of Example 1.
Figure 5C:
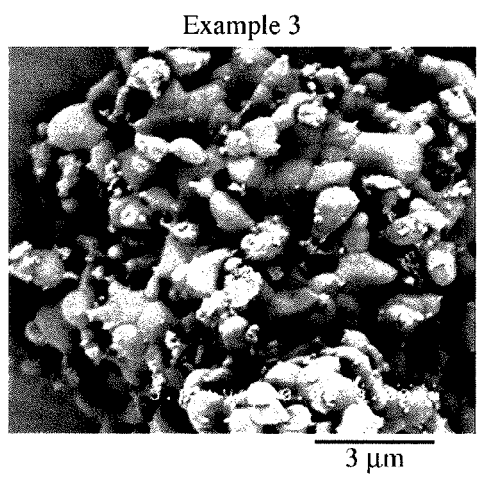
FIG. 5(c) is a SEM photograph (magnification: 10,000 times) of a powder obtained by the calcining step of Example 3.
Figure 6:
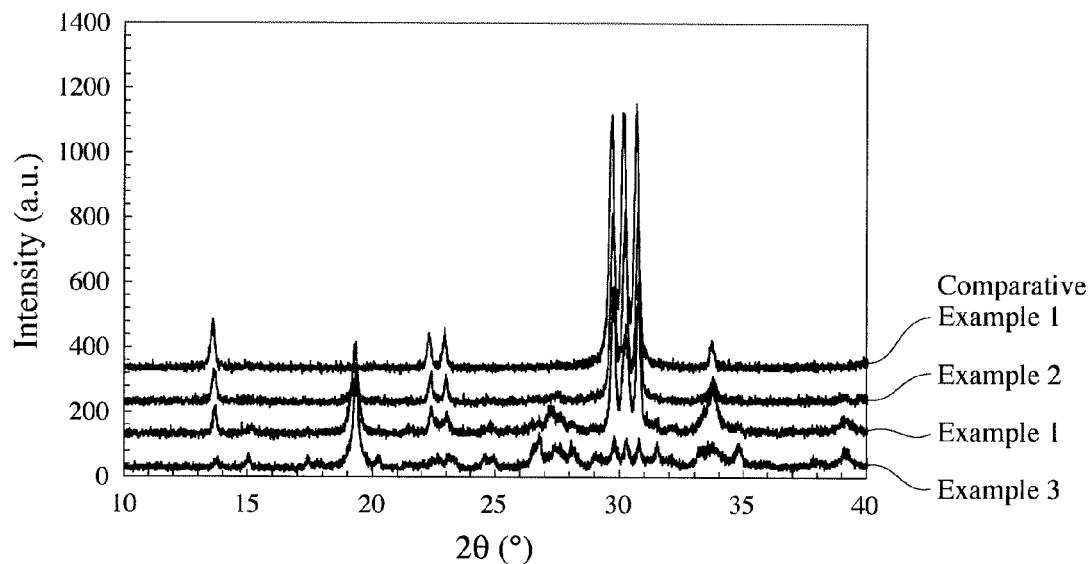
FIG. 6 is a graph showing X-ray diffraction patterns of powders obtained by the calcining steps of Examples 1-3 and Comparative Example 1.

The wet-pulverized product put in an alumina crucible was calcined at 900° C. for 1 hour in air at atmospheric pressure in an electric furnace (Step 4). An $H_2O$ gas and an $SO_3$ gas generated by the reaction were treated by a gas treatment apparatus. With respect to the calcined powder, its SEM photographs are shown in FIGS. 5(a) and 5(b), and its X-ray diffraction pattern is shown in FIG. 6.

Figure 9A:
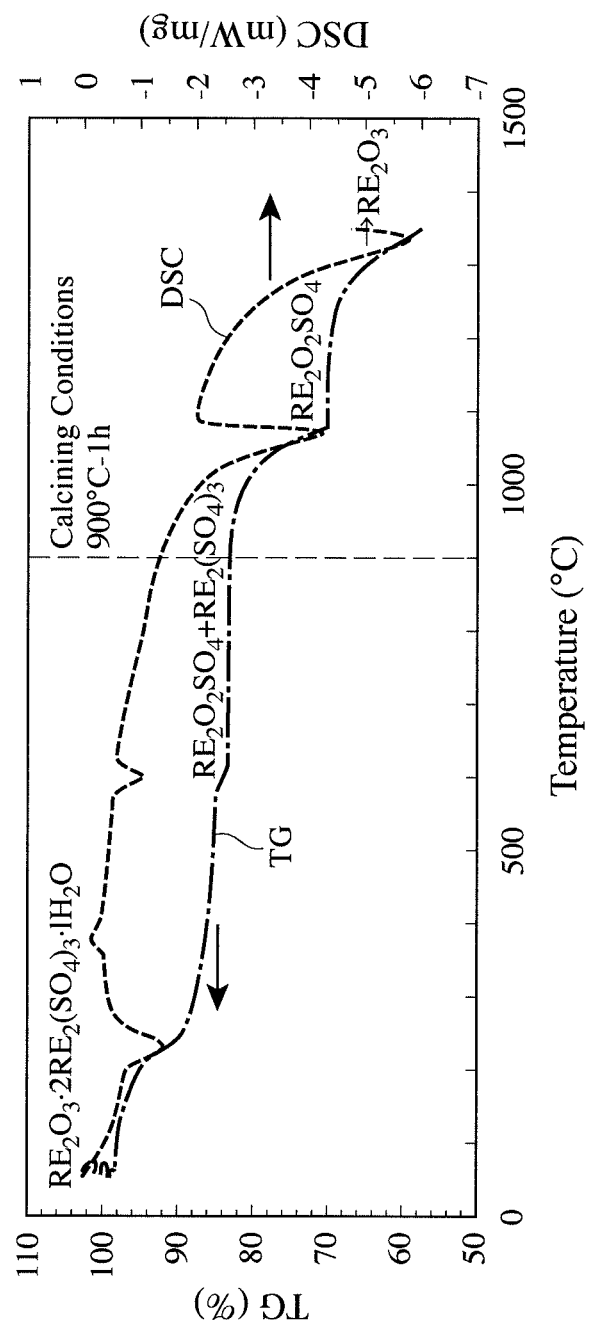
FIG. 9(a) is a graph showing the relations between a calcining temperature and the weight change (TG) and calorie change (DSC) of a product in the calcining step of Example 1.
Figure 9B:
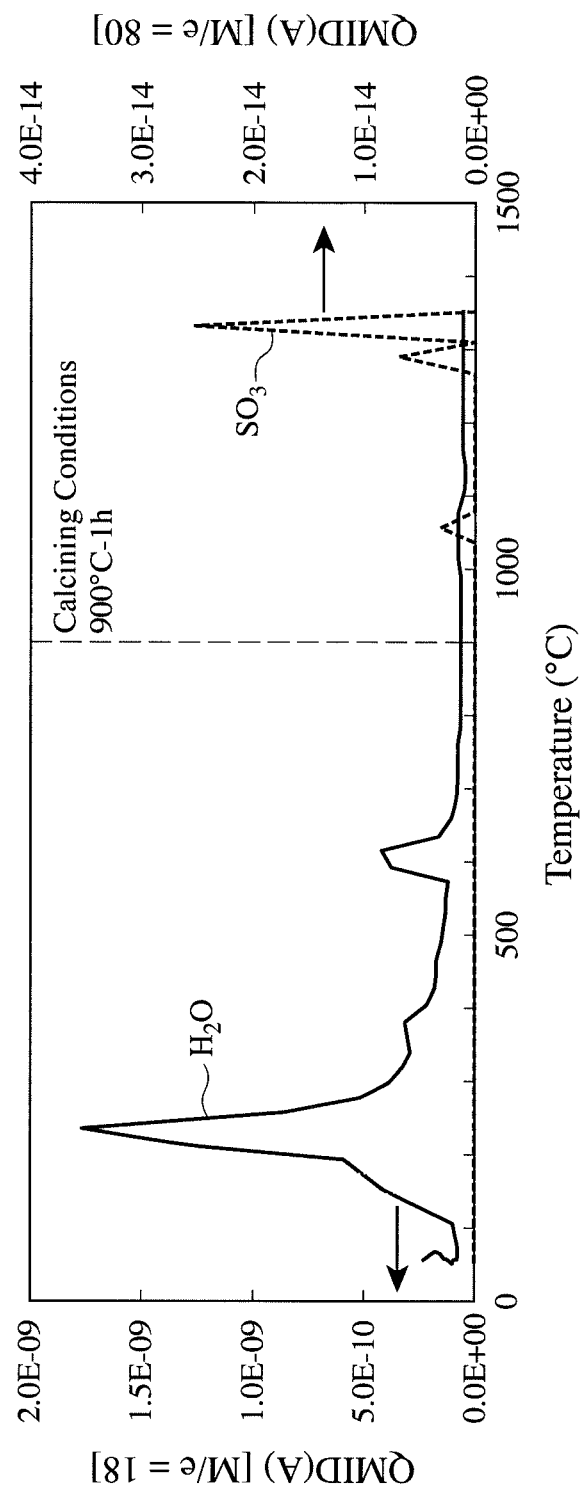
FIG. 9(b) is a graph showing the relations between a calcining temperature and the amounts of gases (QMID) generated from a product in the calcining step of Example 1.

In the calcining step, FIG. 9(a) shows the relations between a calcining temperature and the weight change (TG) and calorie change (DSC) of a product, and FIG. 9(b) shows the relations between a calcining temperature and the amounts of gases generated (QMID). These data were synchronously obtained by two apparatuses available from Netzsch. The weight change (TG) and calorie change (DSC) shown in FIG. 9(a) were measured by TG 449 F3 Jupiter (registered trademark), and the amounts of gases generated (QMID) shown in FIG. 9(b) were measured by QMS 403 D Aëolos (registered trademark). As shown in FIG. 9(a), $RE_2O_2SO_4$ and $RE_2(SO_4)_3$ were formed by calcining, and the amount of $RE_2O_2SO_4$ formed increased as the calcining temperature was elevated. As shown in FIG. 9(b), the amounts of gases generated in the calcining step were determined by the calcining temperature; a lot of an $H_2O$ gas was generated at about 700° C. or lower, and an $SO_3$ started to be generated when it passed about 850° C. It may be presumed that a calcined body comprising (Gd, Pr, Ce)$_2$O$_2$SO$_4$ and (Gd, Pr, Ce)$_2$(SO$_4$)$_3$ as main components was formed under the calcining conditions of Example 1.

Figure 7A:
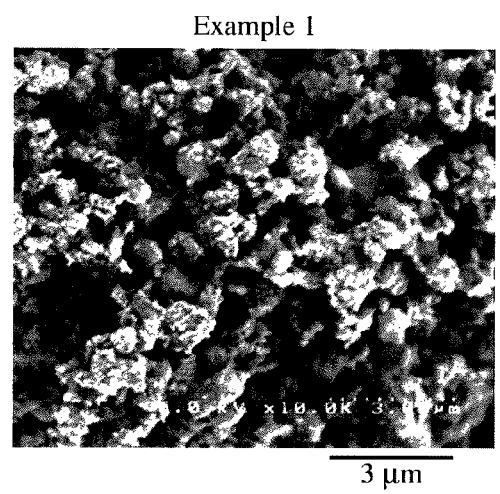
FIG. 7(a) is a SEM photograph (magnification: 10,000 times) of rare earth oxysulfide obtained by the reduction step of Example 1.
Figure 7B:
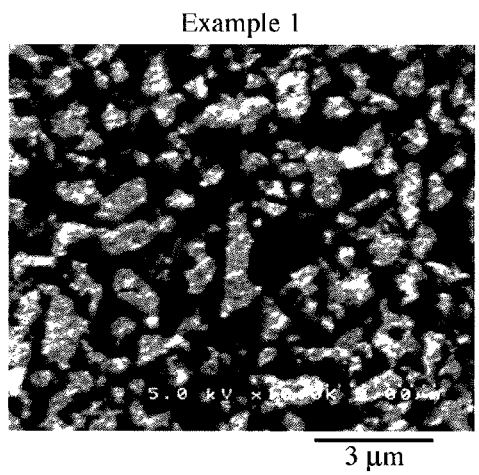
FIG. 7(b) is a SEM photograph (magnification: 10,000 times) showing a cross section of rare earth oxysulfide obtained by the reduction step of Example 1.
Figure 7C:
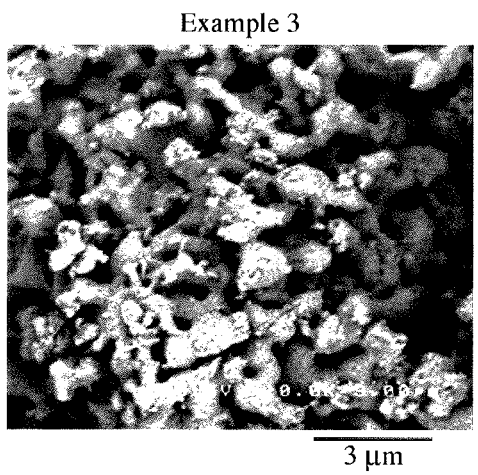
FIG. 7(c) is a SEM photograph (magnification: 10,000 times) showing the appearance of rare earth oxysulfide obtained by the reduction step of Example 3.
Figure 7D:
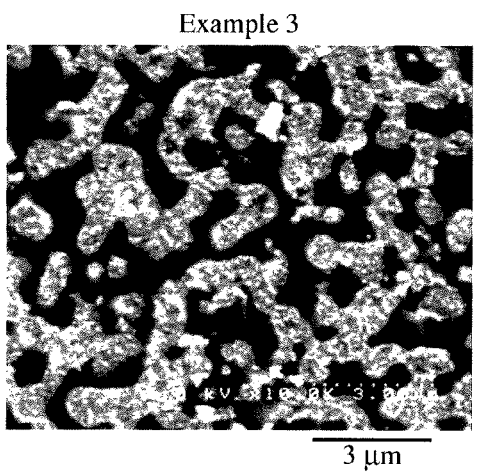
FIG. 7(d) is a SEM photograph (magnification: 10,000 times) showing a cross section of rare earth oxysulfide obtained by the reduction step of Example 3.
Figure 7E:
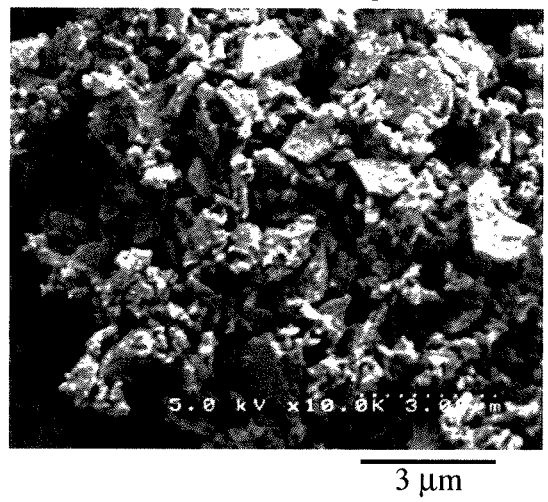
FIG. 7(e) is a SEM photograph (magnification: 10,000 times) showing the appearance of rare earth oxysulfide obtained by the reduction step of Comparative Example 1.
Figure 7F:
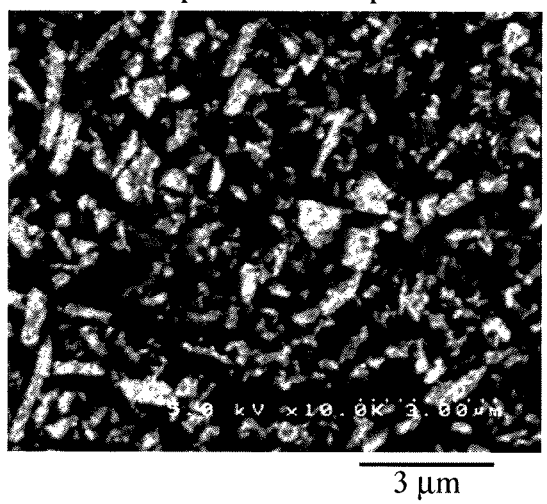
FIG. 7(f) is a SEM photograph (magnification: 10,000 times) showing a cross section of rare earth oxysulfide obtained by the reduction step of Comparative Example 1.
Figure 8:
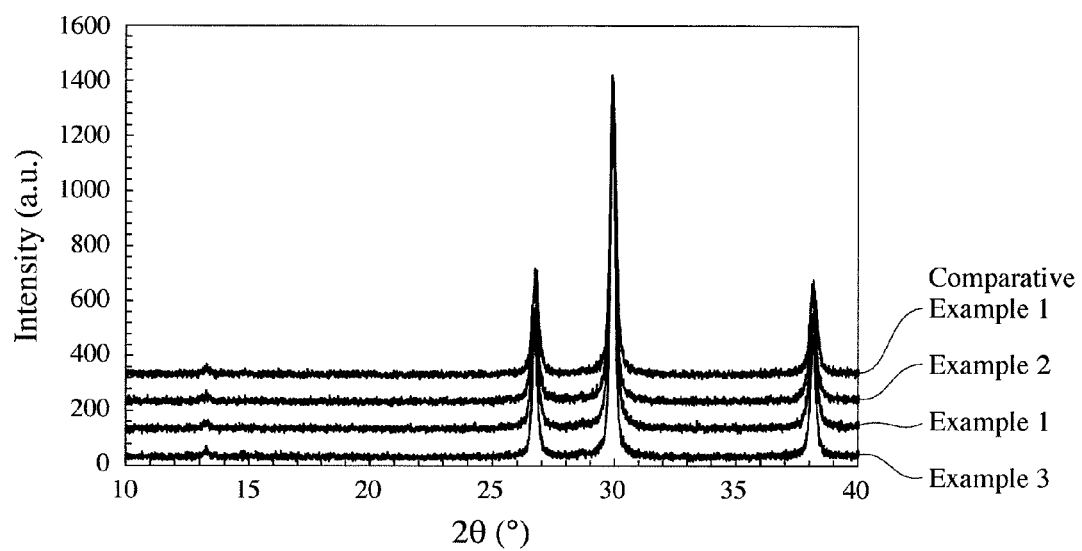
FIG. 8 is a graph showing X-ray diffraction patterns of rare earth oxysulfides obtained by the reduction steps of Examples 1-3 and Comparative Example 1.

The calcined powder in an alumina crucible was reduced at 800° C. for 3 hour in a furnace having a reducing gas atmosphere of hydrogen (Step 5). An $H_2O$ gas and an $H_2S$ gas generated by the reduction treatment were treated by a gas treatment apparatus to obtain rare earth oxysulfide: (Gd, Pr, Ce)$_2$O$_2$S. With respect to this rare earth oxysulfide, its SEM photographs are shown in FIGS. 7(a) and 7(b), and its X-ray diffraction pattern is shown in FIG. 8. FIG. 7(a) shows the appearance of rare earth oxysulfide, and FIG. 7(b) shows a cross section of rare earth oxysulfide. A cross section of a resin-impregnated body of rare earth oxysulfide powder was polished and photographed by SEM.

EXAMPLE 2

Rare earth oxysulfide of (Gd, Pr, Ce)$_2$O$_2$S was formed under the same conditions as in Example 1, except for using 1 mol of rare earth compounds to 1.5 mol of sulfuric acid, such that sulfate ions were 0.75 mol to 1 mol of the rare earth elements. Namely, 122.72 g of sulfuric acid was charged into 1600 ml of pure water. As in Example 1, an $SO_3$ gas and an $H_2S$ gas together with an $H_2O$ gas were generated by the calcining step, the reduction step, etc. The X-ray diffraction patterns of the resultant product, the calcined powder and the rare earth oxysulfide are shown in FIGS. 3, 6 and 8, respectively, as in Example 1.

EXAMPLE 3

Rear earth oxysulfide: (Gd, Pr, Ce)$_2$O$_2$S was formed under the same conditions as in Example 1, except for using 3 mol of sulfuric acid to 1 mol of the rare earth compounds, such that sulfate ions were 1.5 mol to 1 mol of the rare earth elements. Namely, 245.43 g of sulfuric acid was charged into 1600 ml of pure water. As in Example 1, the SEM photographs of the products, the calcined powder and the rare earth oxysulfide are shown in FIGS. 2(b), 4(b), 5(c), 5(d), 7(c) and 7(d), respectively, and their X-ray diffraction patterns are shown in FIGS. 3, 6 and 8, respectively.

Figure 10A:
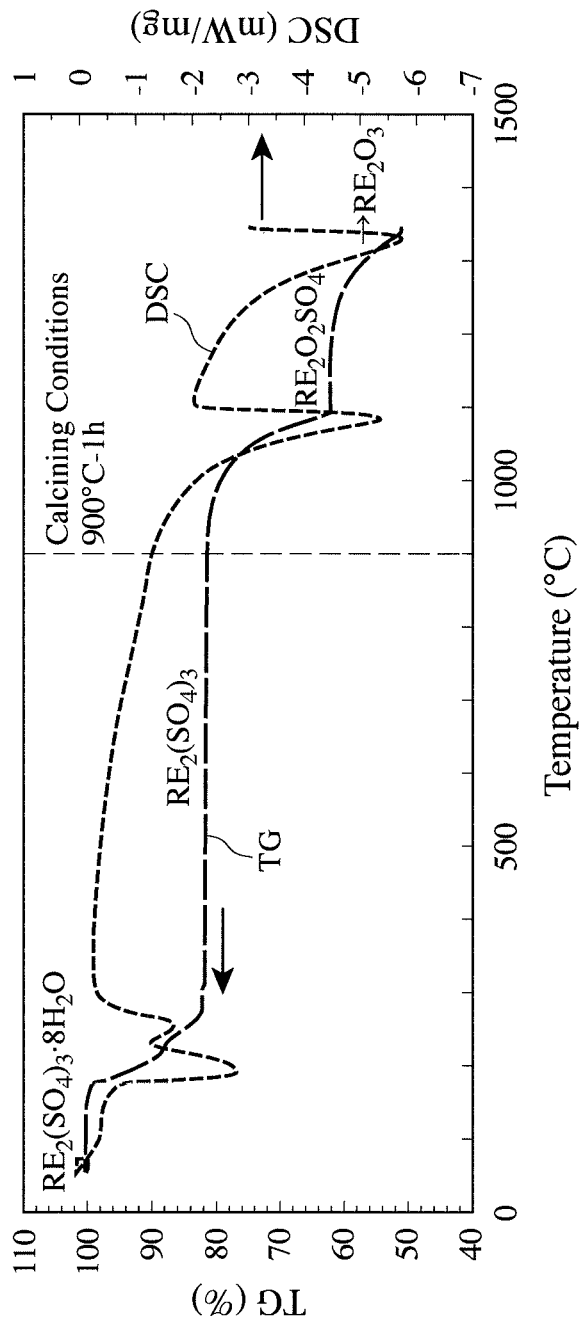
FIG. 10(a) is a graph showing the relations between a calcining temperature and the weight change (TG) and calorie change (DSC) of a product in the calcining step of Example 3.
Figure 10B:
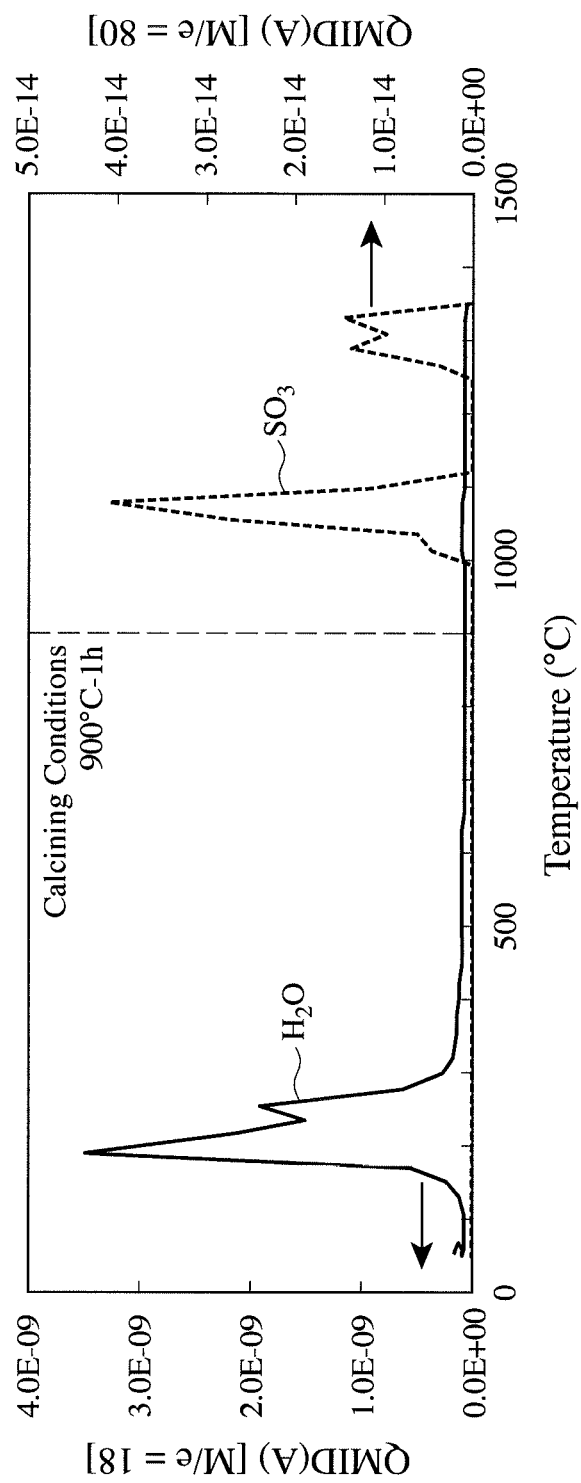
FIG. 10(b) is a graph showing the relations between a calcining temperature and the amounts of gases (QMID) generated from a product in the calcining step of Example 3.

In the calcining step, the relations between a calcining temperature and the weight change (TG) and calorie change (DSC) of a product are shown in FIG. 10(a), and the relations between a calcining temperature and the amounts of gases generated (QMID) are shown in FIG. 10(b). As shown in FIG. 10(a), $RE_2(SO_4)_3$ was formed by calcining, and $RE_2O_2SO_4$ was formed as the calcining temperature was elevated. As shown in FIG. 10(b), the amounts of gases generated in the calcining step were determined by the calcining temperature; an $H_2O$ gas was generated at about 400° C. or lower, and an $SO_3$ gas started to be generated when it exceeded 850° C. A calcined body comprising (Gd, Pr, Ce)$_2$(SO$_4$)$_3$ as a main component and further containing (Gd, Pr, Ce)$_2$O$_2$SO$_4$ was presumably obtained under the calcining conditions of Example 2.

EXAMPLE 4

Rare earth oxysulfide was produced under the same conditions as in Example 1, except that 2 mol of sulfuric acid was used to 1 mol of the rare earth compounds, such that sulfate ions were 1 mol to 1 mol of the rare earth elements, that the amounts of the rare earth compounds and sulfuric acid were increased to 20 times as much as in Example 1, and that a stainless steel container having an inner surface covered with a fluororesin was used in place of a beaker. XRD confirmed that substantially no rare earth oxide was contained as an impurity in the rare earth oxysulfide powder.

EXAMPLE 5

Rare earth oxysulfide was produced under the same conditions as in Example 1, except for using 2 mol of sulfuric acid to 1 mol of rare earth compounds, such that sulfate ions were 1 mol to 1 mol of the rare earth elements, and using terbium oxide in place of praseodymium oxide. Likewise, rare earth oxysulfide was produced under the same conditions except for using neodymium oxide or europium oxide in place of praseodymium oxide. XRD confirmed that substantially no rare earth oxide was contained as an impurity in these rare earth oxysulfide powders.

COMPARATIVE EXAMPLE 1

Rare earth oxysulfide of $(Gd, Pr, Ce)_2O_2S$ was produced under the same conditions as in Example 1, except for using 1 mol of sulfuric acid to 1 mol of rare earth compounds, such that sulfate ions were 0.5 mol to 1 mol of the rare earth elements. Namely, 81.81 g of sulfuric acid was charged into 1600 ml of pure water. As in Example 1, with respect to the products, the calcined powder and the rare earth oxysulfide, their SEM photographs are shown in FIGS. 2(c), 4(c), 5(e), 5(f), 7(e) and 7(f), respectively, and their X-ray diffraction patterns are shown in FIGS. 3, 6 and 8, respectively.

Figure 11A:
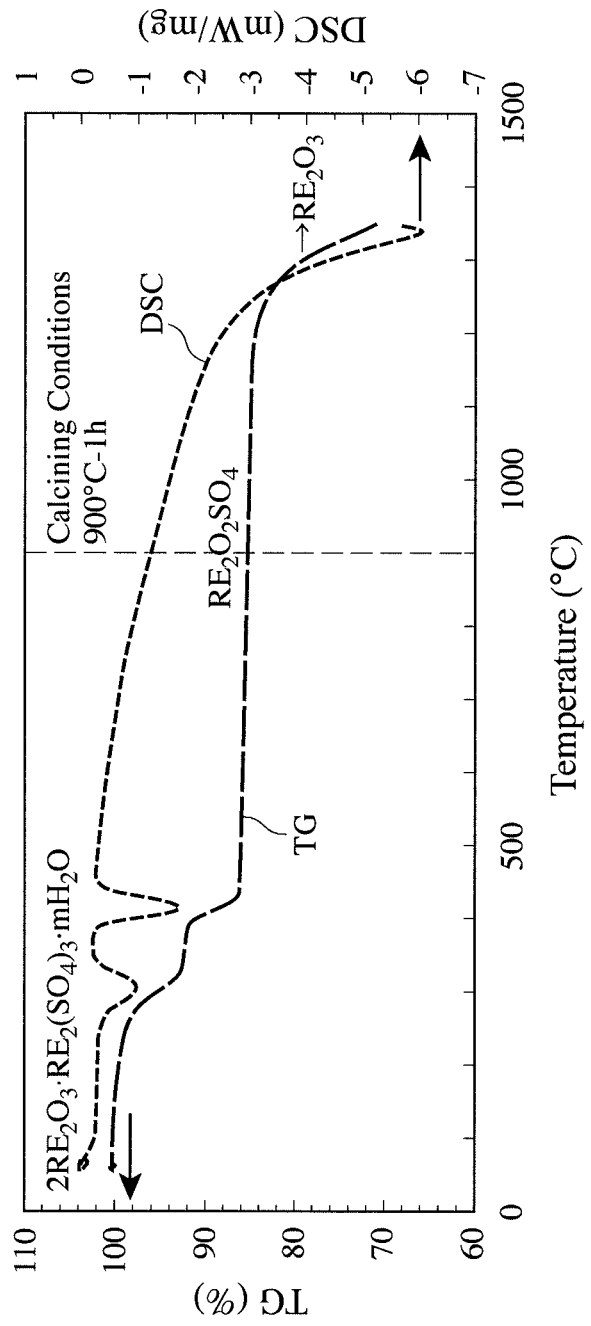
FIG. 11(a) is a graph showing the relations between a calcining temperature and the weight change (TG) and calorie change (DSC) of a product in the calcining step of Comparative Example 1.
Figure 11B:
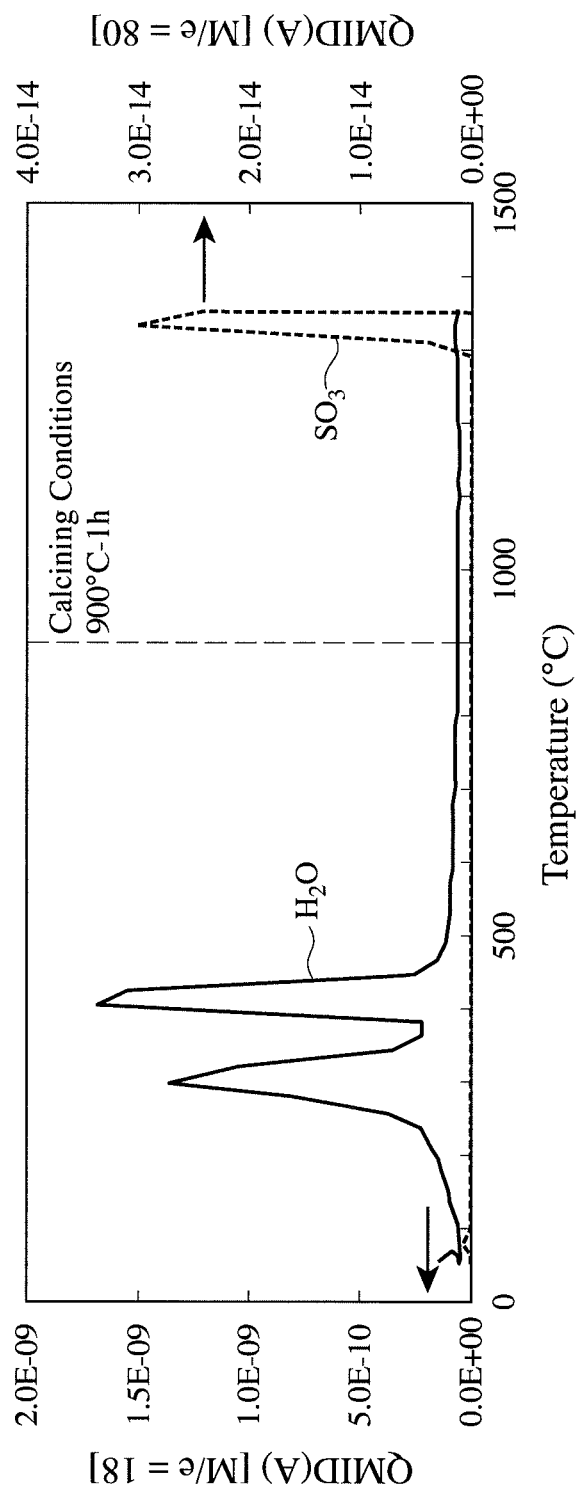
FIG. 11(b) is a graph showing the relations between a calcining temperature and the amounts of gases (QMID) generated from a product in the calcining step of Comparative Example 1.

In the calcining step, the relations between a calcining temperature and the weight change (TG) and calorie change (DSC) of the product are shown in FIG. 11(a), and the relations between a calcining temperature and the amounts of gases generated (QMID) are shown in FIG. 11(b). As shown in FIG. 11(a), $RE_2O_2SO_4$ was formed by calcining. It is presumed that a calcined body having a composition of $(Gd, Pr, Ce)_2O_2SO_4$ was obtained under the calcining conditions of Comparative Example 1. In the calcining step, the reduction step, etc., only an $H_2O$ gas was generated, without an $SO_3$ gas and an $H_2S$ gas.

Figure 5D:
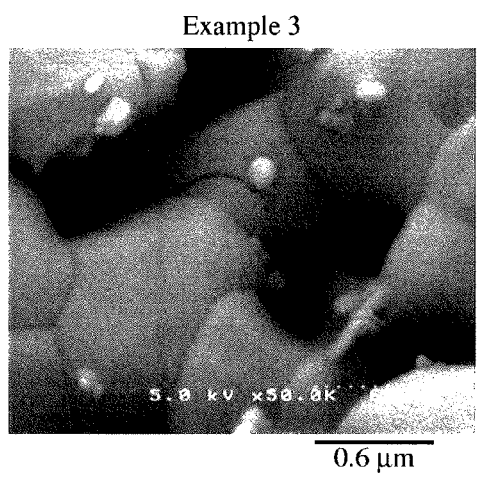
FIG. 5(d) is a SEM photograph (magnification: 50,000 times) of a powder obtained by the calcining step of Example 3.
Figure 5E:
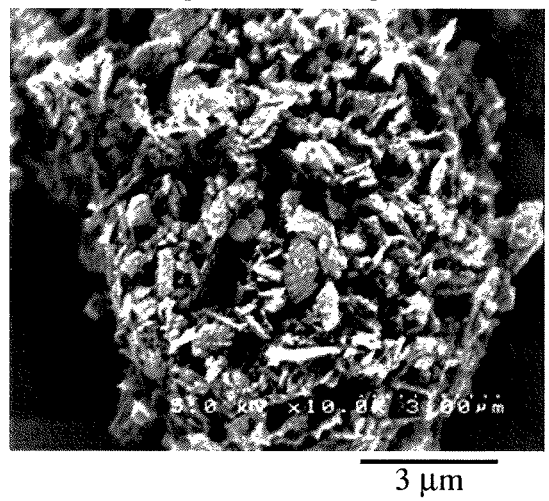
FIG. 5(e) is a SEM photograph (magnification: 10,000 times) of a powder obtained by the calcining step of Comparative Example 1.
Figure 5F:
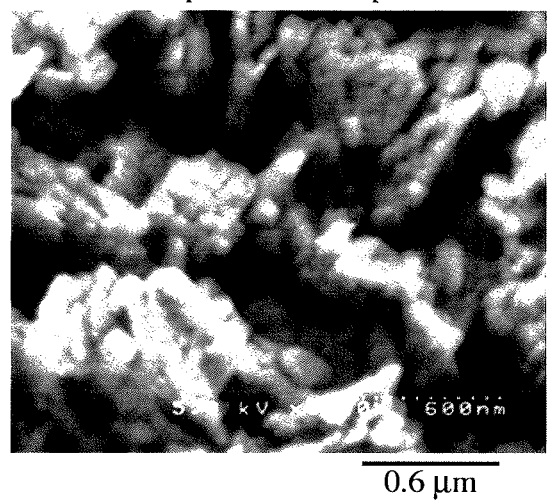
FIG. 5(f) is a SEM photograph (magnification: 50,000 times) of a powder obtained by the calcining step of Comparative Example 1.

In the calcining step and the reduction step in Examples 1-3, part of sulfur components were released as an $SO_3$ gas and an $H_2S$ gas, resulting in only rare earth oxysulfide powder of $(Gd, Pr, Ce)_2O_2S$. As shown in FIG. 5, calcined powder obtained by adding excessive 2 or 3 mol of sulfuric acid to 1 mol of rare earth elements grew to larger particles by cross-linking between particles. Further, the comparison of FIGS. 4(a), 4(b) and 4(c) with FIGS. 5(a), 5(c) and 5(e) revealed that the product had very similar shapes to the calcined powder particles. FIGS. 5(b), 5(d) and 5(f) with high magnification indicate that they were agglomerated secondary particles. As shown in FIG. 7, rare earth oxysulfide obtained by reducing such calcined powder also had powdery shapes reflecting the calcined powder shapes. The calcined powder shown in FIG. 5 was mostly in the form of angular particles in Comparative Example 1 as shown in FIG. 5(f), mostly in the form of round particles in Example 3 as shown in FIG. 5(d), and in both forms in Example 1 as shown in FIG. 5(b). It is presumed from the X-ray diffraction patterns that angular particles were $Gd_2O_2SO_4$, and round particles were $Gd_2(SO_4)_3$. As compared with FIG. 5, the rare earth oxysulfide shown in FIG. 7 had similar shapes to those of the calcined powder. It is considered that because excessive sulfate ions were added to rare earth elements in Examples 1-3, the resultant rare earth oxysulfide powder contained substantially no rare earth oxides as impurities, even by component deviation due to the dissociation of sulfur in the calcining step and the reduction step.

Using the rare earth oxysulfides in Examples 1-3 and Comparative Example 1, ceramic scintillators of sintered rare earth oxysulfides were produced by Steps 6-8 below.

Each rare earth oxysulfide in Examples 1-3 and Comparative Example 1 was blended with a binder in a mortar to form granules (Step 6).

Granules were pressure-molded at 49 MPa by a uniaxial pressure-molding machine, vacuum-sealed in a plastic bag, and then pressure-molded at 294 MPa by a CIP machine (Step 7).

The resultant green body was sintered at 1500° C. in a nitrogen atmosphere in a high-temperature furnace. The sintered body was heat-treated at 1100° C. for 2 hours in an argon atmosphere containing a trace amount of oxygen, and then annealed (Step 8).

Each of the resultant ceramic scintillators was irradiated with X-rays generated from an X-ray tube having a W target tube at voltage of 90 kV and tube current of 20 mA, and the luminescence power of the ceramic scintillator was measured by light-receiving Si photodiodes. Assuming that the luminescence power was 100% in Comparative Example 1, the measured luminescence powers in Examples 1-3 are shown in Table 1. An X-ray diffraction pattern of a polished surface of each ceramic scintillator was measured to determine the presence or absence of foreign phases.

TABLE 1

| No. | Sulfate Ions per 1 Mol of Rare Earth Elements | Luminescence Power | Foreign Phases* |
|---|---|---|---|
| Example 1 | 1 mol | 107% | No |
| Example 2 | 0.75 mol | 107% | No |
| Example 3 | 1.5 mol | 112% | No |
| Com. Ex. 1 | 0.5 mol | 100% | Yes |

Note:
*"Yes" means that the peak intensity of foreign phases was 3% or more of that of rare earth oxysulfide, and "No" means that the peak intensity of foreign phases was less than 3% of that of rare earth oxysulfide.

As is clear from Table 1, a ceramic scintillator obtained from each rare earth oxysulfide of Examples 1-3, which was produced by adding excessive sulfate ions to rare earth elements, had higher luminescence power than that of Comparative Example 1. Each rare earth oxysulfide of Examples 1-3 contained less foreign phases on the surface than the rare earth oxysulfide of Comparative Example 1. A sintered body, which was obtained from each rare earth oxysulfide powder of Examples 1-3 having grown particle shapes than that of Comparative Example 1 and containing no rare earth oxide as an impurity, contained substantially no foreign phases of rare earth oxide, thereby providing a ceramic scintillator having improved luminescence properties.

Figure 12A:
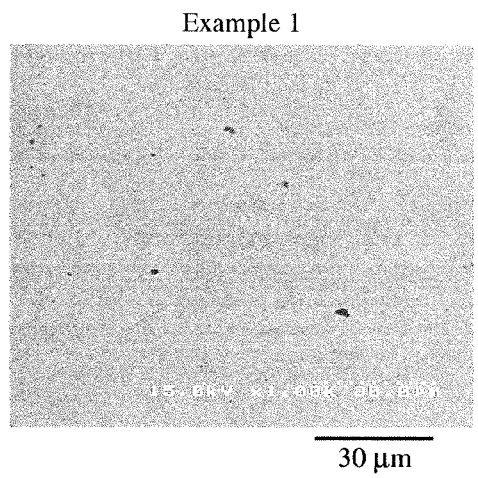
FIG. 12(a) is a SEM photograph (magnification: 1,000 times) of a polished surface of the ceramic scintillator of Example 1.
Figure 12B:
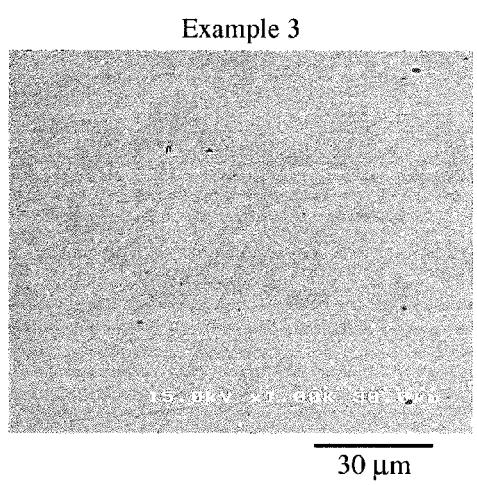
FIG. 12(b) is a SEM photograph (magnification: 1,000 times) of a polished surface of the ceramic scintillator of Example 3.
Figure 12C:
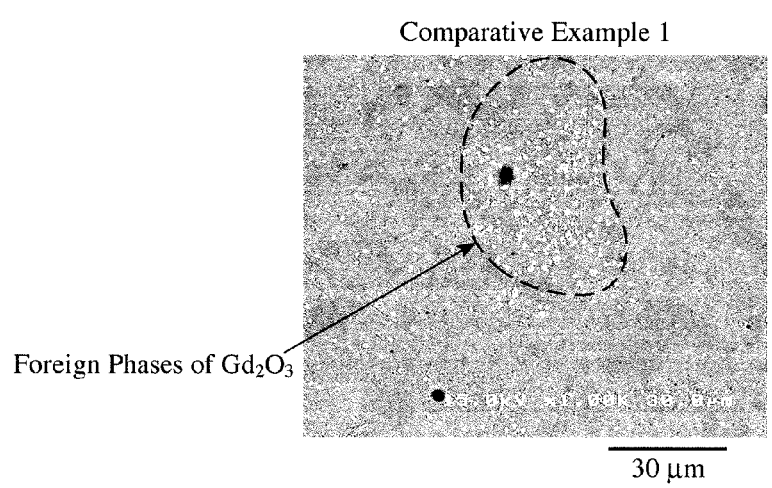
FIG. 12(c) is a SEM photograph (magnification: 1,000 times) of a polished surface of the ceramic scintillator of Comparative Example 1.

A backscattered electron image of the polished surface of each ceramic scintillator of Examples 1 and 3 and Comparative Example 1 was taken by SEM to confirm the presence or absence of foreign phases. The backscattered electron images of Examples 1 and 3 and Comparative Example 1 are shown in FIGS. 12(a) to 12(c). As shown in FIG. 12(c), foreign phases of $Gd_2O_3$ were confirmed on the polished surface of the ceramic scintillator of Comparative Example 1, while no foreign phases were observed on the polished surfaces of the ceramic scintillators of Examples 1 and 3.

EXAMPLES 6 AND 7

Ceramic scintillators were produced from the rare earth oxysulfide of Example 1 by Steps 6-8 above, under the same conditions as in Example 1, except that the sintering temperature was changed to 1300° C. and 1400° C., respectively. The luminescence power of each ceramic scintillator of Examples 6 and 7 and foreign phases therein were determined by the same methods as above. The results are shown in Table 2.

TABLE 2

| No. | Sintering Temperature (° C.) | Luminescence Power (%) | Foreign Phases |
|---|---|---|---|
| Example 6 | 1300 | 104 | No |
| Example 7 | 1400 | 106 | No |

As is clear from Table 2, ceramic scintillators obtained from the rare earth oxysulfides of Examples 6 and 7 produced with different sintering temperatures from that in Example 1 exhibited higher luminescence power than that of Comparative Example 1, like those of Examples 1-3. Also, the rare earth oxysulfides of Examples 6 and 7 contained less foreign phases on the surface than the rare earth oxysulfide of Comparative Example 1, like those of Examples 1-3. A sintered body, which was obtained from each rare earth oxysulfide powder of Examples 6 and 7 having grown particle shapes than that of Comparative Example 1 and containing no rare earth oxide as an impurity, contained substantially no foreign phases of rare earth oxide, like those of Examples 1-3, thereby providing a ceramic scintillator having improved luminescence properties.

EFFECT OF THE INVENTION

Because the present invention mixes a rare earth compound with sulfuric acid and/or sulfate to prepare a reaction solution at such a ratio that sulfate ions are 0.75-1.75 mol to 1 mol of a rare earth element, and calcines and reduces a reaction product, rare earth oxysulfide containing little rare earth compound as an impurity can be produced inexpensively without using an alkali flux. A ceramic scintillator obtained from such rare earth oxysulfide powder contains little foreign phases of a rare earth compound, exhibiting large luminescence intensity and high-sensitivity response to radiations.

What is claimed is:

1. A method for producing rare earth oxysulfide comprising
    a step of mixing a rare earth compound with sulfuric acid and/or sulfate in such a proportion that sulfate ions are 0.75-1.75 mol to 1mol of the rare earth element, thereby causing their reaction to obtain a product;
    a step of calcining said product to form calcined powder; and
    a step of reducing said calcined powder to obtain rare earth oxysulfide.

2. The method for producing rare earth oxysulfide according to claim 1, wherein said rare earth compound is at least one selected from the group consisting of oxides, hydroxides, halides, nitrates, sulfates, acetates, phosphates and carbonates of rare earth elements.

3. The method for producing rare earth oxysulfide according to claim 1, wherein said product or said calcined powder is pulverized after said mixing step or said calcining step.

4. The method for producing rare earth oxysulfide according to claim 1, wherein said rare earth compound comprises at least gadolinium as a rare earth element.

5. The method for producing rare earth oxysulfide according to claim 1, wherein said rare earth compound comprises at least gadolinium and praseodymium as rare earth elements.

6. The method for producing rare earth oxysulfide according to claim 1, wherein said sulfate contains the same rare earth element as in said rare earth compound.

7. The method for producing rare earth oxysulfide according to claim 1, wherein when rare earth compounds comprising plural types of rare earth elements are mixed in said mixing step, smaller amounts of rare earth compounds are earlier added to an aqueous solution containing sulfate ions.

8. The method for producing rare earth oxysulfide according to claim 1, wherein said reaction solution is heated in said mixing step.

9. The method for producing rare earth oxysulfide according to claim 1, wherein a product is filtered out of said reaction solution in said mixing step, and dried to obtain a powdery product.

10. The method for producing rare earth oxysulfide according to claim 1, wherein said reaction solution is dried to obtain a powdery product in said mixing step.

11. A method for producing a ceramic scintillator comprising
    a step of granulating powder of rare earth oxysulfide produced by the method claim 1 to obtain granules;
    a step of molding said granules to obtain a green body; and
    a step of sintering said green body to obtain sintered rare earth oxysulfide.

12. The method for producing a ceramic scintillator according to claim 11, wherein said sintering step is carried out in an inert atmosphere at atmospheric pressure.

13. The method for producing a ceramic scintillator according to claim 11, wherein said sintering step is carried out at 1300-1600° C.

14. The method for producing a ceramic scintillator according to claim 11, wherein said sintered body is annealed after the sintering step.

15. A ceramic scintillator produced by the method recited in claim 11.

16. A scintillator array comprising the ceramic scintillators recited in claim 15.

17. A radiation detector comprising the ceramic scintillators recited in claim 15.

18. The method for producing rare earth oxysulfide according to claim 1, wherein the step of mixing comprises mixing the rare earth compound with sulfuric acid, wherein the sulfuric acid is used in an amount of 1.5-3 mols to 1 mol of the rare earth compound.

19. The method for producing rare earth oxysulfide according to claim 1, wherein the sulfate ions are 0.75-1 mol to 1 mol of the rare earth element.

* * * * *